United States Patent
Chang et al.

(10) Patent No.: US 7,286,713 B2
(45) Date of Patent: Oct. 23, 2007

(54) METHOD FOR DETECTING AND CLASSIFYING BLOCK EDGE FROM DCT-COMPRESSED IMAGE

(75) Inventors: Hyun Sung Chang, Daejeon (KR); Kyeongok Kang, Daejeon (KR); Jinwoong Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 770 days.

(21) Appl. No.: 10/645,434

(22) Filed: Aug. 18, 2003

(65) Prior Publication Data

US 2004/0120587 A1  Jun. 24, 2004

(30) Foreign Application Priority Data

Dec. 23, 2002  (KR) ............ 10-2002-0082866

(51) Int. Cl.
*G06K 9/36* (2006.01)
*G06K 9/46* (2006.01)

(52) U.S. Cl. ............ 382/250; 382/232; 382/251; 375/240.2

(58) Field of Classification Search ........ 382/232–233, 382/250–251, 253, 268; 375/240.2, 240.03, 375/240.29; 358/1.9, 426.14
See application file for complete search history.

(56) References Cited

U.S. PATENT DOCUMENTS 5,719,958 A    2/1998  Wober et al.
5,787,204 A *  7/1998  Fukuda ................. 382/233
5,841,477 A * 11/1998  Kim ..................... 375/240.24
6,356,587 B1 * 3/2002  Choi .................... 375/240
6,370,279 B1 * 4/2002  Paik .................... 382/268

FOREIGN PATENT DOCUMENTS

KR       100265722      6/2000

OTHER PUBLICATIONS

ETRI Journal, vol. 24, No. 1, Feb. 2002, pp. 23-30.
IEEE Transactions on Communications, vol. 39, No. 4, Apr. 1991, pp. 549-556.

* cited by examiner

*Primary Examiner*—Matthew C. Bella
*Assistant Examiner*—Ali Bayat
(74) *Attorney, Agent, or Firm*—Blakely, Sokoloff, Taylor & Zafman

(57) ABSTRACT

The present invention provides a method for detecting and classifying block edges from DCT-compressed images, and more particularly, a fast method for classifying the edge direction of each block in the DCT-compressed images. The method includes: extracting DCT coefficients by blocks constituting the compressed image; and applying an arithmetic operation defined for each direction component to the DCT coefficients, and comparing the results of the arithmetic operations to determine the edge direction component. The present invention is directly applied in the DCT domain based on the quantitative analysis on the contribution factor of each DCT coefficient to formation of the directional pattern of the block edge, thereby drastically reducing the computational complexity of arithmetic operations necessary to the detection and classification of block edges.

10 Claims, 1 Drawing Sheet

METHOD FOR DETECTING AND CLASSIFYING BLOCK EDGE FROM DCT-COMPRESSED IMAGE

CROSS REFERENCE TO RELATED APPLICATION

This application claims priority to and the benefit of Korea Patent Application No. 2002-82866 filed on Dec. 23, 2002 in the Korean Intellectual Property Office, the content of which is incorporated herein by reference.

BACKGROUND OF THE INVENTION (a) Field of the Invention

The present invention relates to a method for detecting block edges from DCT (Discrete Cosine Transform)-compressed images and classifying the edge direction of each block. More specifically, the present invention relates to a method for receiving a DCT-compressed image, recovering DCT coefficients through partial decoding, detecting the edge of each block according to the results of minimal arithmetic operations in the DCT domain without IDCT (Inverse Discrete Cosine Transform), and if any, classifying the edge direction of each block.

(b) Description of the Related Art

The conventional technologies for detecting the edge direction of each block from an image have been described in the related documents as follows.

"Image Vector Quantizer Based on a Classification in the DCT Domain" (IEEE Transactions on Communications, Vol. 39, No. 4, April 1991) by D. S. Kim and S. U. Lee in 1991 discloses a method for detecting and classifying the edge of each block to be quantized so as to improve performance in encoding an image using vector quantization. In this method, a block edge classifier is required to be trained in advance using some image data having an actual block edge component in order to classify the edge of each block. The DCT domain is divided according to the directional component of each edge, and with given DCT coefficients, the directional component of the block edge is determined based on which division the DCT coefficients fall on. This method can be implemented very simply without the IDCT step in classifying the edge component of each block in images, but the performance is greatly dependent upon the training data because it is an inductive method.

"Efficient Use of MPEG-7 Edge Histogram Descriptor" (ETRI Journal, Vol. 24, No. 1, February 2002) by C. S. Won et al. in 2001 proposed a method of classifying the edge direction of each block as well as a method of applying information about edge direction of each block to the retrieval of images. But, the proposed method, which is performed in the pixel domain, requires IDCT for an input DCT-compressed image, increasing the computational load.

SUMMARY OF THE INVENTION

It is an advantage of the present invention to provide a method for extracting block edges and classifying the edge direction of each block using relatively simple arithmetic operations for DCT coefficients obtained from DCT-compressed images by partial decoding.

In one aspect of the present invention, there is provided a method for detecting and classifying block edges from DCT-compressed images, which is directly applied to the DCT coefficients obtained by a partial decoding of the DCT-compressed image by the respective blocks. The method includes: (a) extracting DCT coefficients by blocks constituting the compressed image; and (b) applying an arithmetic operation defined for each direction component to the DCT coefficients obtained in the step (a), and comparing the results of the arithmetic operations to determine the edge direction component.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
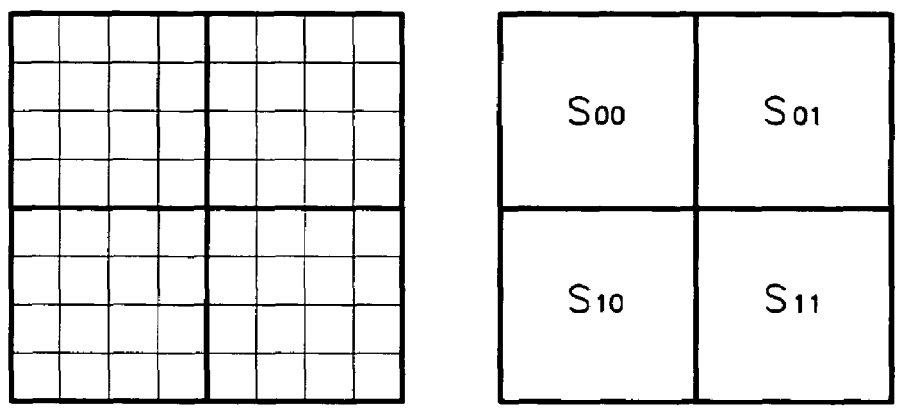
FIG. 1 is an illustration of a pixel domain adapting a block edge detection and classification method according to the present invention.

FIG. 1 illustrates a pixel domain where the block edge detection and classification method is developed according to the present invention.

Most DCT-based image compression standards, in which the image is considered as a two-dimensional (2-D) array of pixel blocks, include the steps of applying 2-D DCT to each block, and performing a non-uniform quantization for each DCT coefficient and variable length coding, thereby enhancing compression efficiency. The technical conception of the present invention can be applied irrespective of the block size, but expediently, the description will be given with the block size of 8×8 pixels.

In the pixel domain, each block is divided into four regions, as shown in FIG. 1, so as to classify the directional component of each block edge. The ordinate (up-to-down) and abscissa (left-to-right) coordinates in one block are denoted by i and j, respectively; and the luminance value of each pixel in the block is given by x(i, j) (where i, j=0, 1, ..., 7). The averaged luminance value of each area is then expressed by the following equation:

$$S_{uv} = \frac{1}{16}\sum_{i=0}^{3}\sum_{j=0}^{3} x(4u+i, 4v+j), \quad u, v = 0, 1 \qquad \text{[Equation 1]}$$

The directional pattern of each edge differentiated by angles in the units of $\pi/4$ radian can be estimated according to the distribution of $S_{uv}$ as expressed by the following equation 2. The direction-based arithmetic operations are measured, and the directional component of each block edge is classified as the one whose measure is the greatest among others.

$\delta_{NE}$ (set by a user) [Equation 2]

$$\delta_0 = \left| \frac{S_{00}+S_{01}}{2} - \frac{S_{10}+S_{11}}{2} \right|$$

$$\delta_{\pi/4} = \max\left\{ \left|S_{00} - \frac{S_{01}+S_{10}+S_{11}}{3}\right|, \left|S_{11} - \frac{S_{00}+S_{01}+S_{10}}{3}\right| \right\}$$

$$\delta_{\pi/2} = \left| \frac{S_{00}+S_{10}}{2} - \frac{S_{01}+S_{11}}{2} \right|$$

$$\delta_{3\pi/4} = \max\left\{ \left|S_{01} - \frac{S_{00}+S_{10}+S_{11}}{3}\right|, \left|S_{10} - \frac{S_{00}+S_{01}+S_{11}}{3}\right| \right\}$$

where $\delta_\theta$ represents the arithmetic operation for the $\theta$ radian directional component; and $\delta_{NE}$ represents the measure in the case where there is no edge component. $\delta_{NE}$ is not separately calculated, and can be predetermined by the user.

To define 2-D DCT with 8×8 samples, $C_{2N}^\tau$ and $e(\tau)$ are expressed by the following equations 3 and 4, respectively, and the luminance value $x(k,l)$ of the pixels by blocks is converted to the DCT coefficient $X(m,n)$ according to the equation 5.

$$C_{2N}^\tau = \cos\frac{\pi\tau}{2N} \quad \text{[Equation 3]}$$

$$e(\tau) = \begin{cases} 1/\sqrt{2}, & \text{if } \tau=0 \\ 1, & \text{elsewhere} \end{cases} \quad \text{[Equation 4]}$$

$$X(m,n) = \frac{e(m)e(n)}{16\alpha} \sum_{k=0}^{7} \sum_{l=0}^{7} x(k,l) C_{16}^{(2k+1)m} C_{16}^{(2l+1)n}, \quad \text{[Equation 5]}$$

$$m, n = 0, 1, \ldots, 7$$

The inverse transform, i.e., IDCT for the equation 5 is expressed by the equation 6.

$$X(k,l) = \alpha \sum_{m=0}^{7} \sum_{n=0}^{7} e(m)e(n) X(m,n) C_{16}^{(2k+1)m} C_{16}^{(2l+1)n}, \quad \text{[Equation 6]}$$

$$k, l = 0, 1, \ldots, 7$$

In the equations 5 and 6, $\alpha$ is a multiplicative constant determined in consideration of the different variants of the DCT equation.

When substituting the equation 6 into the equation 1, each arithmetic operation of the edge direction component as expressed by the equation 2 is rewritten as the following equation 7 in terms of the DCT coefficients.

$$\delta_0 = 2|V|$$

$$\delta_{\pi/4} = 4\max\{|H+V+D|, |H+V-D|\}/3$$

$$\delta_{\pi/2} = 2|H|$$

$$\delta_{3\pi/4} = 4\max\{|H-V+D|, |H-V-D|\}/3 \quad \text{[Equation 7]}$$

In the equation 7, H, V, and D are given by the equation 8.

$$H = \sum_{\substack{n=1 \\ (odd)}}^{7} w(0,n) X(0,n) \quad \text{[Equation 8]}$$

$$V = \sum_{\substack{n=1 \\ (odd)}}^{7} w(m,0) X(m,0)$$

$$D = \sum_{\substack{n=1 \\ (odd)}}^{7} w(n,n) X(n,n) +$$

$$\sum_{\substack{m=1 \\ (odd)}}^{7} \sum_{\substack{n=1 \\ (odd)}}^{m-1} w(m,n)(X(m,n) + X(n,m))$$

In the equation 8, $w(m, n)$ is given by the equation 9.

$$w(m,n) = \alpha e(m) e(n) C_{16}^{4m} C_{16}^{2m} C_{16}^{m} C_{16}^{4n} C_{16}^{2n} C_{16}^{n} \quad \text{[Equation 9]}$$

All of the absolute values of the equation 7 are calculated with a computational load of 18 multiplications and 27 additions, which corresponds to around one-fifth of the computational load of 94 multiplications and 454 additions in the 2-D fast IDCT process. This means that the method for detecting block edges and classifying the edge direction of each block in the DCT domain assures the same performance with a drastic cut of the computational load relative to the method in the pixel domain.

Most the DCT-based image compression standards include the step of quantizing DCT coefficients. Thus, the DCT coefficients undergo being multiplied by dequantizing multiplicative constants to be recovered the DCT coefficients in decoding the compressed images. Instead of the ordinary dequantizing multiplicative constant, the dequantizing multiplicative constant scaled by $w(m, n)$ can be used for dequantization in order to directly calculate "$Y(m, n) = w(m, n) X(m, n)$". In this case, the equation 8 is rewritten as the following equation 10, avoiding the computational load of multiplications.

$$H = \sum_{\substack{n=1 \\ (odd)}}^{N-1} Y(0,n), \quad \text{[Equation 10]}$$

$$V = \sum_{\substack{n=1 \\ (odd)}}^{N-1} Y(m,0),$$

$$D = \sum_{\substack{m=1 \\ (odd)}}^{N-1} \sum_{\substack{n=1 \\ (odd)}}^{N-1} Y(m,n)$$

$w(m, n)$ is rapidly decreased with an increase in "m" and "n". This means that the detection and classification results are not seriously affected by truncating the high frequency components of the DCT coefficients above the upper limits of the "m" and "n" set to L ($1 \leq L \leq N-1$) rather than (N−1) in summations of the equation 8 or 10. For L=1, the calculation results of the equation 9 are $w(0,1) = w(1,0) \approx 0.4531\alpha$ and $w(1,1) \approx 0.4105\alpha$, both of which can be approximated to $0.5\alpha$, expediently.

Hereinafter, reference will be made to FIG. 2 in order to describe the implementation method of this technical conception.

Figure 2:
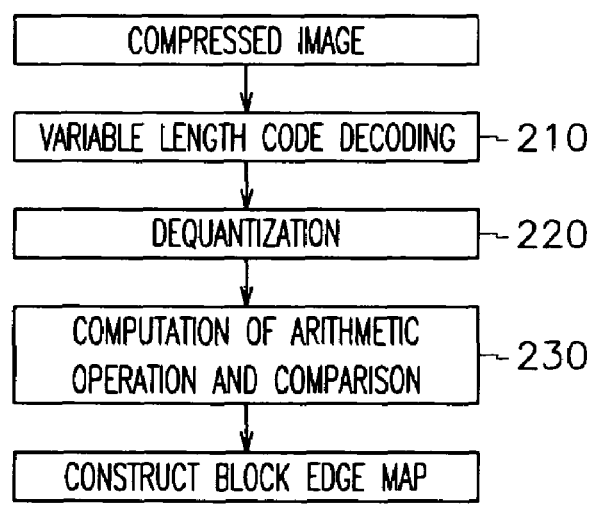
FIG. 2 is a flow chart of the block edge detection and classification method according to the present invention.

Referring to FIG. 2, the method includes a block-based variable length code decoding step 210 using DCT-compressed images as an input, a dequantizing step 220 to obtain DCT coefficients, and a block edge detecting step 230 using arithmetic operation and comparison of the DCT coefficients, to construct a block edge map.

As described above, most of the DCT-based image compression standards use a method of DCT, non-uniform quantization of DCT coefficients, and compression by a variable-length coding technique, such as run-length coding or Huffman coding. In this specification of the present invention, the process for run-length coding and Huffman code decoding will not be described in detail.

The variable-length code decoding step 210 includes decoding the run-length code and the Huffman code of each block in the DCT-compressed image.

The dequantizing step 220 includes multiplying each of the non-uniformly quantized DCT coefficients obtained through the variable length code decoding step by a multiplicative constant to recover the DCT coefficients. For enhancing the efficiency of computation, as described above, a new multiplicative constant obtained by multiplying the ordinary dequantizing multiplicative constant by w(m, n) can be used to perform dequantization and directly calculate Y(m, n)=w(m, n)X(m, n).

The block edge detecting step 230 using arithmetic operation and comparison includes calculating $\delta_0$, $\delta_{\pi/4}$, $\delta_{\pi/2}$ and $\delta_{3\pi/4}$ according to the equation 7~9, comparing these four values with $\delta_{NE}$ predefined by the user, and selecting the component whose measure is the largest value as the edge direction of the corresponding block. The equation 8 is substituted with the equation 10 in the case of directly recovering Y(m, n)=w(m, n)X(m, n) instead of X(m, n) in the dequantizing step 220.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the present invention provides a method for classifying the edge direction of each block in the DCT-compressed image that is directly applied in the DCT domain based on the quantitative analysis on the contribution factor of each DCT coefficient to formation of the directional pattern of the block edge, thereby drastically reducing the computational complexity of arithmetic operations necessary to the detection and classification of block edges.

What is claimed is:

1. A method for detecting and classifying block edges from DCT (Discrete Cosine Transform)-compressed images, the method comprising:
   (a) extracting DCT coefficients by N×N blocks constituting a compressed image;
   (a1) forming a plurality of regions in each block, each region defining a direction; and
   (b) applying an arithmetic operation defined for each direction to the DCT coefficients obtained in (a), and comparing results of the arithmetic operations among the directions of a corresponding block to determine an edge direction component for the corresponding block, the arithmetic operations using an averaged luminance value of each region represented in terms of the DCT coefficients.

2. The method as claimed in claim 1, wherein the arithmetic operation of (b) comprises a combination of H, V, and D that are the weighted sums of the extracted DCT coefficients as given by the following equations:

$$H = \sum_{\substack{n=1 \\ (odd)}}^{N-1} w(0, n)X(0, n)$$

$$V = \sum_{\substack{n=1 \\ (odd)}}^{N-1} w(m, 0)X(m, 0)$$

$$D = \sum_{\substack{n=1 \\ (odd)}}^{N-1} w(n, n)X(n, n) + \sum_{\substack{m=1 \\ (odd)}}^{N-1} \sum_{\substack{n=1 \\ (odd)}}^{m-1} w(m, n)(X(m, n) + X(n, m))$$

where m and n represent spatial frequency components in vertical and horizontal directions, respectively, and satisfy $0 \leq m, n \leq N$.

3. The method as claimed in claim 1, wherein (a) comprises extracting Y(m, n)=w(m, n)X(m, n) that is a multiplication of the DCT coefficient X(m, n) by a quantitative numeric, rather than simply extracting the DCT coefficient,
   wherein (b) of performing each arithmetic operation comprises determining H, V, and D according to the following equations to construct an arithmetic operation for each direction using a combination of H, V, and D:

$$H = \sum_{\substack{n=1 \\ (odd)}}^{N-1} Y(0, n),$$

$$V = \sum_{\substack{n=1 \\ (odd)}}^{N-1} Y(m, 0),$$

$$D = \sum_{\substack{m=1 \\ (odd)}}^{N-1} \sum_{\substack{n=1 \\ (odd)}}^{N-1} Y(m, n).$$

4. The method as claimed in claim 2, wherein (b) of calculating H, V, and D comprises performing summations up to upper limits of the "m" and "n" set to L ($1 \leq L \leq N-1$) rather than N−1 to construct the arithmetic operation for each direction.

5. The method as claimed in claim 3, wherein (b) of calculating H, V, and D comprises performing summations up to upper limits of the "m" and "n" set to L ($1 \leq L \leq N-1$) rather than N−1 to construct the arithmetic operation for each direction.

6. The method as claimed in claim 4, wherein (b) comprises setting L=1, and computing H, V, and D with w(0,1)= w(1,0)=w(1,1)≈0.5 α.

7. The method as claimed in claim 2, wherein w(m, n) of (b) is calculated according to the following equation:

$$w(m, n) = \alpha e(m)e(n) C_{16}^{4m} C_{16}^{2m} C_{16}^{m} C_{16}^{4n} C_{16}^{2n} C_{16}^{n}$$

wherein $$C_{2N}^{\tau} = \cos\frac{\pi\tau}{2N}; \; e(\tau) = \begin{cases} 1/\sqrt{2}, & \text{if } \tau = 0; \\ 1, & \text{elsewhere} \end{cases}$$

and $\alpha$ is a multiplicative constant.

8. The method as claimed in claim 3, wherein w(m, n) of (b) is calculated according to the following equation:

$$w(m, n) = \alpha e(m)e(n) C_{16}^{4m} C_{16}^{2m} C_{16}^{m} C_{16}^{4n} C_{16}^{2n} C_{16}^{n}$$

wherein $$C_{2N}^{\tau} = \cos\frac{\pi\tau}{2N}; \; e(\tau) = \begin{cases} 1/\sqrt{2}, & \text{if } \tau = 0; \\ 1, & \text{elsewhere} \end{cases}$$

and $\alpha$ is a multiplicative constant.

9. The method as claimed in claim 2, wherein (b) comprises classifying each direction into NE (No Edge), 0 radian, $\pi/4$ radian, $\pi/2$ radian, and $3\pi/4$ radian, computing the arithmetic operation of each directional using the H, V, and D determined in claim 2 according to the following equations, and determining the edge direction component of each block as the one having the greatest value among the directions of the corresponding block:

$\delta_{NE}$(set by a user)

$\delta_0 = 2|V|$ $$\delta_{\pi/4} = \frac{4}{3}\max\{|H + V + D|, |H + V - D|\}$$

$$\delta_{\pi/2} = 2|H|$$

$$\delta_{3\pi/4} = \frac{4}{3}\max\{|H - V + D|, |H - V - D|\}.$$

10. The method as claimed in claim 3, wherein (b) comprises classifying each direction into NE (No Edge), 0 radian, $\pi/4$ radian, $\pi/2$ radian, and $3\pi/4$ radian, computing the arithmetic operation of each directional using the H, V, and D determined in claim 3 according to the following equations, and determining the edge direction component of each block as the one having the greatest value among the directions of the corresponding block:

$\delta_{NE}$(set by a user)

$\delta_0 = 2|V|$ $$\delta_{\pi/4} = \frac{4}{3}\max\{|H + V + D|, |H + V - D|\}$$

$$\delta_{\pi/2} = 2|H|$$

$$\delta_{3\pi/4} = \frac{4}{3}\max\{|H - V + D|, |H - V - D|\}.$$

* * * * *